(12) United States Patent
Oh

(10) Patent No.: US 6,398,834 B2
(45) Date of Patent: Jun. 4, 2002

(54) CYCLONE TYPE DUST COLLECTING APPARATUS FOR A VACUUM CLEANER

(75) Inventor: Jang-keun Oh, Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 8 days.

(21) Appl. No.: 09/758,908

(22) Filed: Jan. 10, 2001

(30) Foreign Application Priority Data

Jul. 26, 2000 (KR) .......................................... 00-43198

(51) Int. Cl.$^7$ .............................................. B01D 45/12
(52) U.S. Cl. ......................... 55/424; 55/428; 55/459.1; 55/DIG. 3
(58) Field of Search ............................... 55/459.1, 423, 55/424, 428, DIG. 3; 15/353

(56) References Cited

U.S. PATENT DOCUMENTS

| 3,426,513 A | * | 2/1969 | Bauer .......................... 209/719 |
| 3,990,976 A | | 11/1976 | Nishioka .................... 210/512 |
| 5,350,432 A | | 9/1994 | Lee ............................. 55/408 |
| 5,525,396 A | * | 6/1996 | Rudolph et al. ............. 428/131 |
| 5,935,279 A | * | 8/1999 | Kilstrom ...................... 15/350 |
| 6,228,151 B1 | * | 5/2001 | Conrad et al. ................ 55/424 |
| 6,269,518 B1 | * | 8/2001 | Yung ........................... 15/352 |

FOREIGN PATENT DOCUMENTS

| DE | 3815086 C1 | * | 8/1989 |
| DE | 199 45 403 | | 9/1999 |
| EP | 0 681 102 | | 11/1995 |
| EP | 0 966 912 | | 12/1999 |
| FR | 1468124 | | 12/1966 |
| GB | 2 298 598 | | 9/1996 |
| JP | 5-168979 | | 7/1993 |
| WO | WO 96/27446 | | 9/1996 |
| WO | WO 99/34722 | | 7/1999 |

OTHER PUBLICATIONS

Search Report Issued Mar. 22, 2001 by the Dutch Industrial Property Office with respect to corresponding Dutch Patent Application No. 1017181.

* cited by examiner

Primary Examiner—Robert A. Hopkins
(74) Attorney, Agent, or Firm—Ladas & Parry

(57) ABSTRACT

A cyclone type dust collecting apparatus for a vacuum cleaner includes a cyclone body having a cylindrical shape, open upper and lower ends and a contaminant outlet. Air and contaminants are drawn into the cyclone body through one open end of the cyclone body. The contaminants are separated from the air by centrifugal force and are discharged through the contaminant outlet, which is located proximate the other open end of the cyclone body. The apparatus further includes a contaminant receptacle for collecting the contaminants that have been discharged from the cyclone body. The contaminant receptacle has open upper and lower ends and surrounds the cyclone body. A base member is connected to and closes the lower end of the cyclone body and the contaminant receptacle, and a cover is removably connected to the upper end of the cyclone body and the contaminant receptacle. The cover includes an air inlet and an air outlet, both of which communicate with the cyclone body. The cover further includes a contaminant separating grill that has a plurality of fine holes. The grill extends downward from the air outlet and into the cyclone body. The apparatus further includes a partition that is disposed between the cyclone body and the contaminant receptacle for restricting the movement of the contaminants in the contaminant receptacle.

6 Claims, 3 Drawing Sheets

CYCLONE TYPE DUST COLLECTING APPARATUS FOR A VACUUM CLEANER

BACKGROUND OF THE INVENTION

1. Field of the Invention

The present invention relates to a vacuum cleaner, and more particularly, to a cyclone type dust collecting apparatus for a vacuum cleaner that separates by centrifugal force contaminants from the air that is drawn into the vacuum cleaner.

2. Description of the Related Art

Generally, a vacuum cleaner, such as an upright-type vacuum cleaner or the like, has a suction brush that is connected to the body of the vacuum cleaner and moves along on the cleaning surface. The body of the vacuum cleaner includes a dust collecting chamber, in which a dust filter is detachably mounted, and a motor driving chamber, in which a motor for generating the suction force is mounted. The suction force draws air and any dust or dirt on the cleaning surface into the cleaner body. The air is discharged from the cleaner after passing through the dust filter that is disposed in the dust collecting chamber of the cleaner body. The various contaminants in the air are filtered out by the dust filter, and the clean air is discharged to the environment.

The general vacuum cleaner described above, however, has a structure, in which contaminants are filtered and collected by an expendable dust filter. When the dust filter is clogged with contaminants, the filter has to be replaced, and a user must manually remove the used, dirty filter and insert a new one, which is both inconvenient and unhygienic.

SUMMARY OF THE INVENTION

The present invention has been made to overcome the above problems of the related art. Accordingly, it is an object of the present invention to provide a cyclone type dust collecting apparatus for a vacuum cleaner that is capable of separating by centrifugal force and collecting dust or contaminants from the air that is drawn in by a suction brush of the vacuum cleaner.

In accordance with the present invention, the above object is accomplished by a cyclone type dust collecting apparatus for a vacuum cleaner including a cyclone body having a cylindrical shape, open upper and lower ends and a contaminant outlet. Air and contaminants are drawn into the cyclone body through one open end of the cyclone body. The contaminants are separated from the air by centrifugal force and are discharged through the contaminant outlet, which is located proximate the other open end of the cyclone body. The apparatus further includes a contaminant receptacle for collecting the contaminants that have been discharged from the cyclone body. The contaminant receptacle has open upper and lower ends and surrounds the cyclone body. A base member is connected to and closes the lower end of the cyclone body and the contaminant receptacle, and a cover is removably connected to the upper end of the cyclone body and the contaminant receptacle. The cover includes an air inlet and an air outlet, both of which communicate with the cyclone body. The cover further includes a contaminant separating grill that has a plurality of fine holes. The grill extends downward from the air outlet and into the cyclone body. The apparatus further includes a partition that is disposed between the cyclone body and the contaminant receptacle for restricting the movement of the contaminants in the contaminant receptacle.

BRIEF DESCRIPTION OF THE DRAWINGS

The above objects and other features and advantages of the present invention will become more apparent after a reading of the following detailed description in conjunction with the drawings, in which.

DETAILED DESCRIPTION OF PREFERRED EMBODIMENT

The present invention of a cyclone type dust collecting apparatus for a vacuum cleaner will be described in greater detail below with reference to the accompanying drawings.

Figure 1:
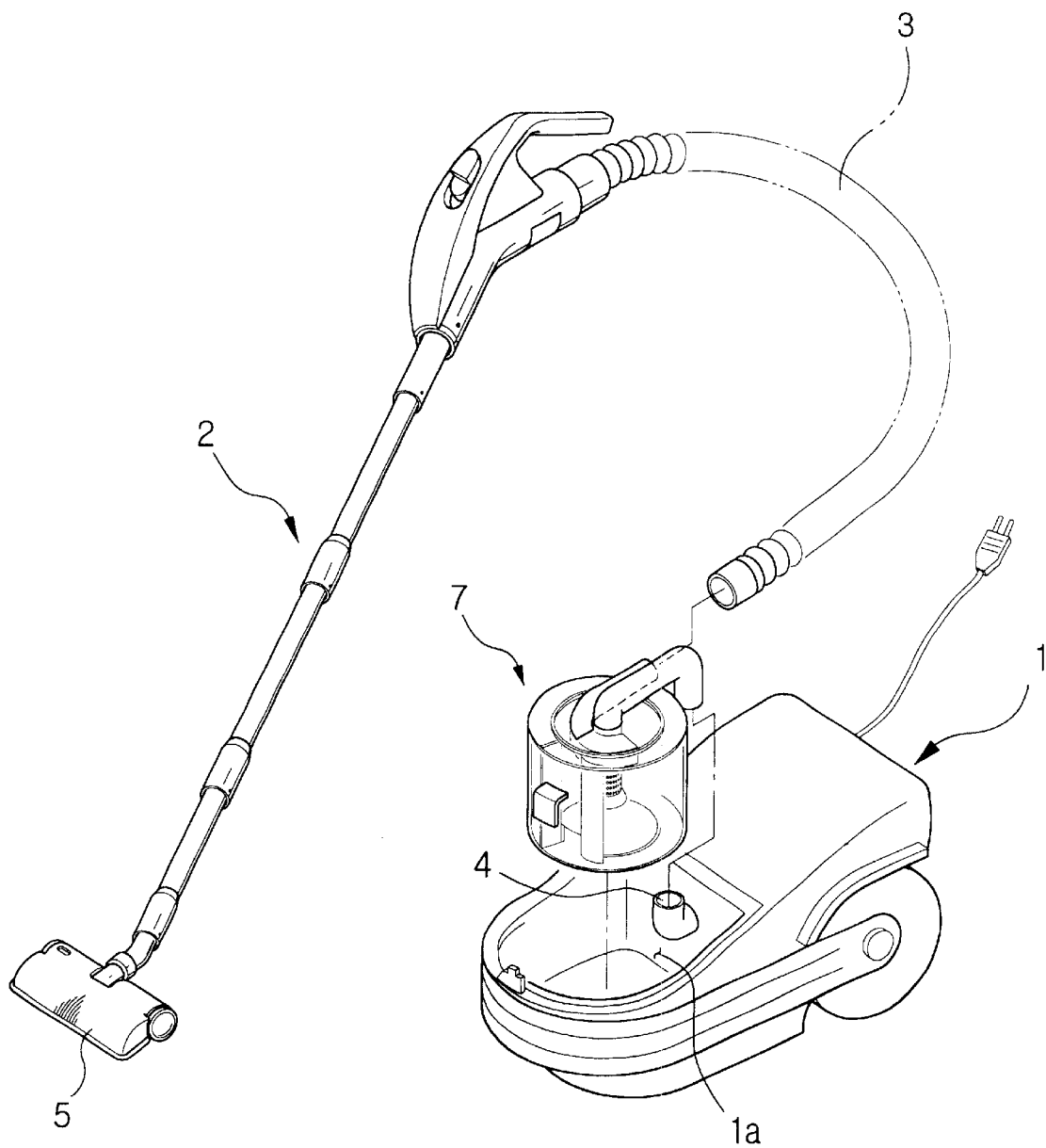
FIG. 1 is a schematic exploded perspective view of a vacuum cleaner having a cyclone type dust collecting apparatus according to a preferred embodiment of the present invention.

FIG. 1 is a schematic exploded perspective view of a vacuum cleaner having a cyclone type dust collecting apparatus in accordance with a preferred embodiment of the present invention.

Referring to FIG. 1, the vacuum cleaner includes a body 1, a suction brush 5 that is connected to the body 1 through a connecting tube 2 and a connecting hose 3, and a cyclone type dust collecting device 7.

The cleaner body 1 includes a dust collecting chamber 1a, in which the cyclone dust collecting device 7 is nested, and a motor driving chamber (not shown), in which a motor (not shown) is nested. According to the preferred embodiment of the present invention, the motor driving chamber and the dust collecting chamber 1a, communicate with each other through an air passage tube 4. The motor generates a strong suction force, which enables the suction brush 5 to draw in contaminants on the cleaning surface. The suction brush 5 is connected via the connecting tube 2 and the connecting hose 3 to the cyclone dust collecting device 7, which is located in the dust collecting chamber 1a. A cover (not shown) is attached to the cleaner body 1 to cover the cyclone dust collecting device 7.

Figure 2:
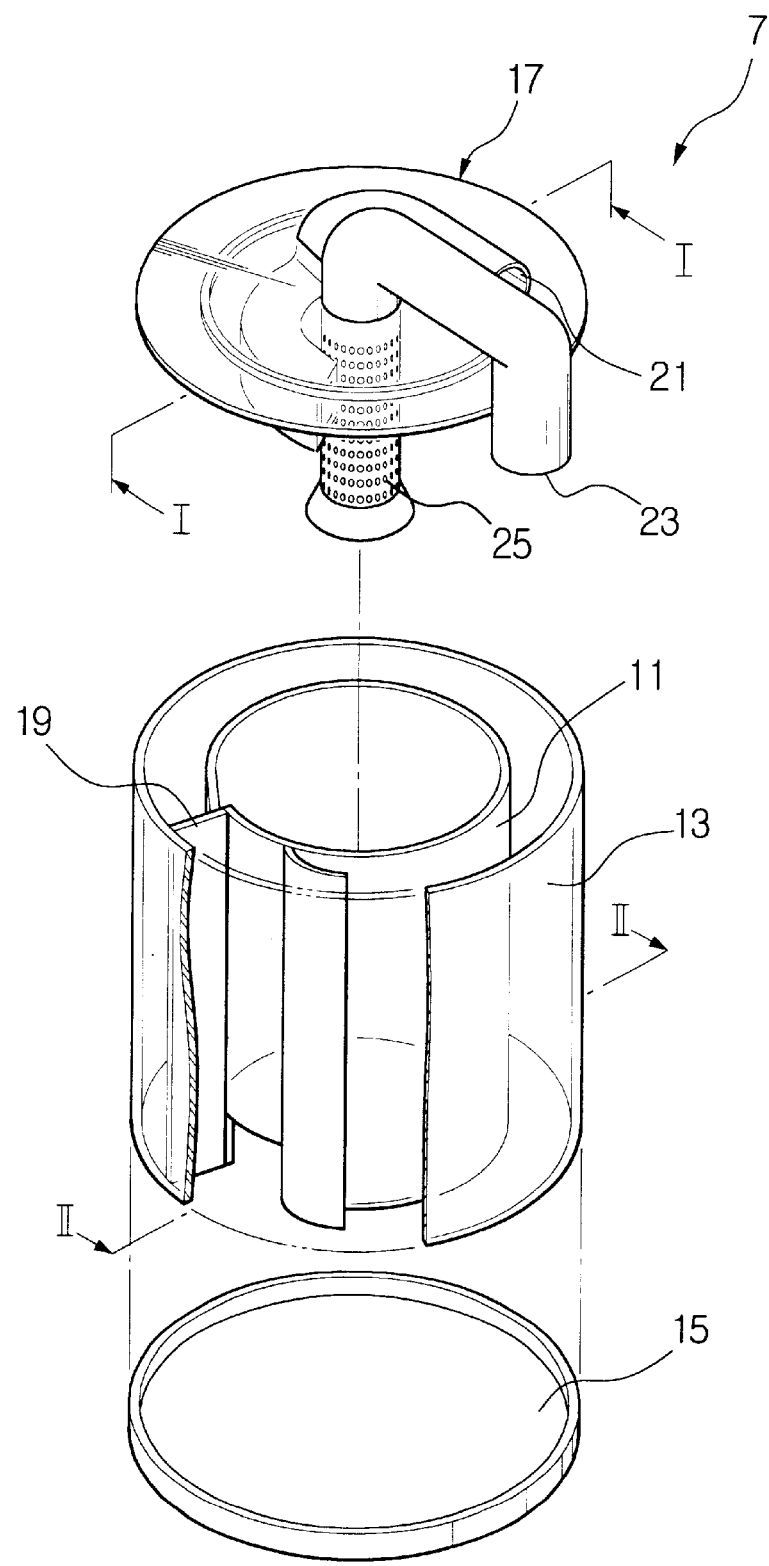
FIG. 2 is an exploded perspective view of the cyclone type dust collecting apparatus shown in FIG. 1.
Figure 3:
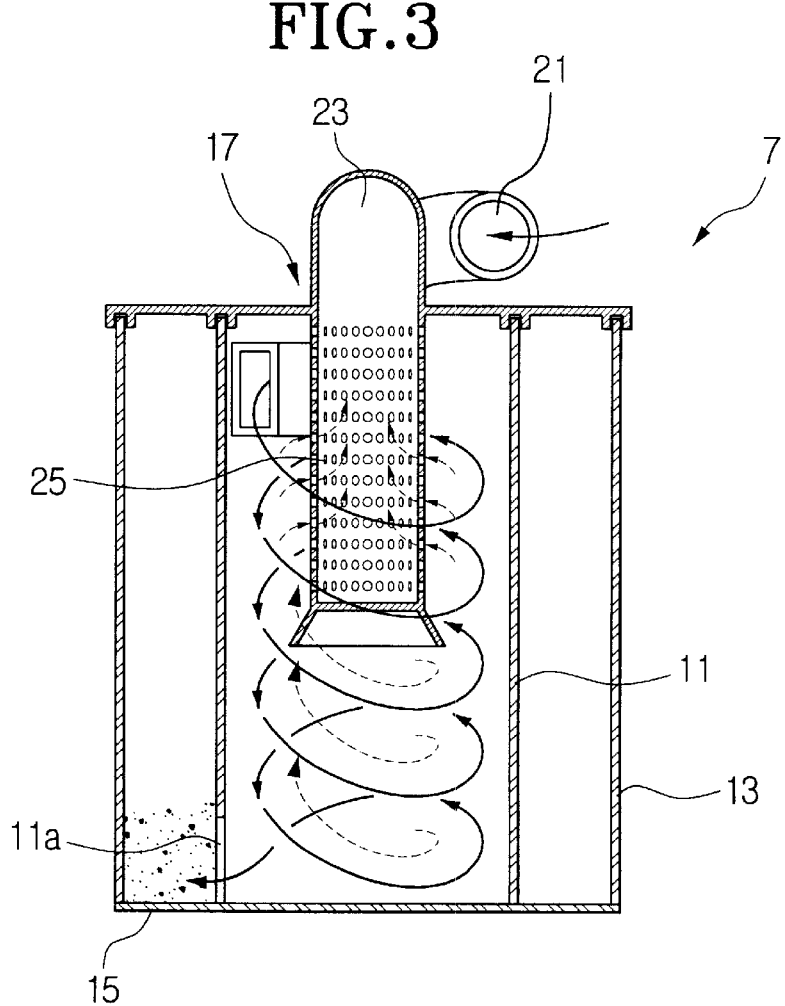
FIG. 3 is a cross-sectional view taken generally along the line I—I of FIG. 2, showing the assembled cyclone type dust collecting apparatus.

The cyclone dust collecting device 7 separates by centrifugal force and collects contaminants from the air that is drawn into the vacuum cleaner through the suction brush 5. The cyclone dust collecting device 7 is detachably nested in the dust collecting chamber 1a. As shown in FIGS. 2 and 3, such a cyclone dust collecting device 7 includes a cyclone body 11, a contaminant receptacle 13, a base member 15, a cover 17, and a partition 19.

The cyclone body 11 has a substantially hollow cylindrical shape with a predetermined inner diameter. The cyclone body 11 includes open upper and lower portions. The cyclone body 11 further includes a contaminant outlet 11a of a predetermined size formed on the lower portion of the cyclone body 11. Accordingly, contaminants in the air, which is drawn into the upper portion of the cyclone body 11, are separated from the air by centrifugation and discharged into the contaminant receptacle 13 through contaminant outlet 11a.

The contaminant receptacle 13 serves as a collection place for the contaminants that have been discharged through the contaminant outlet 11a. The contaminant receptacle 13 is connected to the cyclone body 11 and preferably surrounds the cyclone body 11. More specifically, the contaminant receptacle 13 is substantially a hollow cylinder which has a larger diameter than that of the cyclone body 11 and concentrically surrounds the cyclone body 11, providing a predetermined space between the outer circumference of the cyclone body 11 and that of the contaminant receptacle 13. Further, the contaminant receptacle 13 has open upper and lower portions and a height that is identical to the height of the cyclone body 11. The cyclone body 11 and the contaminant receptacle 13 communicate with each other only through the contaminant outlet 11a.

The base member 15 of the cyclone dust collecting device 7 is connected to, and thus closes, the lower portion of the cyclone body 11 and the contaminant receptacle 13. Accordingly, the size of the base member 15 corresponds to the lower portion of the contaminant receptacle 13 and is preferably a circular plate. The base member 15 is preferably integrally formed with the contaminant receptacle 13.

The cover 17 is connected to the upper portion of the cyclone body 11 and the contaminant receptacle 13. The cover 17 includes an air inlet 21, an air outlet 23, and a grill 25, all of which communicate with the cyclone body 11.

Air and contaminants, which are drawn in through the suction brush 5 (see FIG. 1), pass through the connecting hose 3 and into the air inlet 21. The air inlet 21 extends along the interior of the cyclone body 11, near the center, to generate a vortex out of the air that is drawn into the cyclone body 11. After the air and the contaminants are drawn through the air inlet 21, and the contaminants are separated from the air by centrifugation, the clean air is discharged through the air outlet 23. The air outlet 23 extends from the center of the cover 17 to the outer edge of the cover. The air outlet 23 communicates with the motor driving chamber via the air passage tube 4.

Extending downward from the air outlet 23 of the cover 17 is the contaminant separation grill 25. The grill 25 has a plurality of fine holes through which the air, but not larger contaminant particles, can pass.

A partition 19 restricts the movement of the contaminants that are collected in the contaminant receptacle 13. The partition 19 extends between the inner wall of the contaminant receptacle 13 and the outer wall of the cyclone body 11 and is preferably located adjacent to the contaminant outlet 11a. More specifically, it is preferable that the partition 19 extends from the edge of the contaminant outlet 11a. Accordingly, the contaminants discharged through the contaminant outlet 11a are stored in the contaminant receptacle 13, after moving approximately 360° around the contaminant receptacle 13 to the partition 19. In addition, the partition 19 prevents the contaminants from returning to the contaminant outlet 11a as the contaminants move about the contaminant receptacle 13. It is preferable that the partition 19 is made of the same material as that of the cyclone body 1, the contaminant receptacle 13, and the base member 15. This material may be a transparent plastic material or the like.

Figure 4:
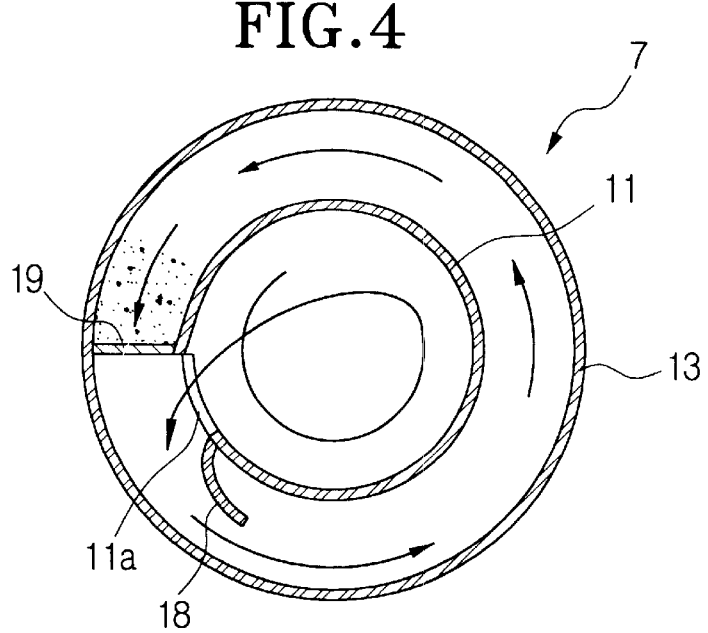
FIG. 4 is a sectional view taken generally along the line II—II of FIG. 2, showing the assembled cyclone type dust collecting apparatus.

It is further preferable that the cyclone dust collecting device 7 of the present invention include a reverse flow prevention means for preventing reverse flow of the contaminants collected in the contaminant receptacle 13 back into the cyclone body 11 through the contaminant outlet 11a. As shown in FIG. 4, the reverse flow prevention means includes a guide member 18 that extends inward from the outer surface of the cyclone body 11, adjacent to the contaminant outlet 11a, and into the contaminant receptacle 13. The guide member 18 is formed adjacent to an edge of the contaminant outlet 11a and has the same height as that of the contaminant receptacle 13. Furthermore, the guide member 18 is formed on the outer circumference of the cyclone body 11 at an acute angle, and has a facing section that faces the outer circumference of the cyclone body 11. The facing section has a predetermined radius of curvature. Such a guide member 18 can be made of an elastic film and attached to the cyclone body 11 by an adhesive, such as bond, etc.

The operation of the cyclone dust collecting apparatus of the present invention is as follows:

First, when the vacuum cleaner is on, the motor generates a strong suction force at the suction brush 5. This suction force draws in air and contaminants on the cleaning surface through the suction brush 5, connecting tube 2 and connecting hose 3, and into the cyclone body 11. Air enters the cyclone body 11 through the air inlet 21 in an oblique direction with respect to the cyclone body 11, and descends into the cyclone body 11 while creating a vortex. Accordingly, the contaminants are separated from the air by the centrifugal force of the vortex and are discharged to the contaminant receptacle 13 through the contaminant outlet 11a. Once in the contaminant receptacle 13, the contaminants rotate obliquely about the receptacle 13, as shown in FIG. 4, until they reach the partition 19, which prevents further rotation of the contaminants. As described above, the cylindrical design of the concentric contaminant receptacle 13 and cyclone body 11, and the partition 19 of the contaminant receptacle 13 minimize the possibility of a reverse flow of contaminants back into the cyclone body 11 through the contaminant outlet 11a. Further, the guide member 18, which is located adjacent to the contaminant outlet 11a, effectively blocks any reverse flow of the contaminants back into the cyclone body 11.

Meanwhile, after the contaminants have been separated from the air, the clear air in the cyclone body 11 is discharged to the environment through the fine holes of the grill 25 and the air outlet 23.

When the contaminant receptacle 13 is filled with the contaminants, the user removes the cyclone device 7 from the cleaner body 1, takes the cover 17 off of the cyclone body 11 and the contaminant receptacle 13, and dumps out the contaminants from the contaminant receptacle 13.

Although FIG. 1 shows the cyclone type dust collecting apparatus employed in a canister-type vacuum cleaner, it will be clearly understood that such a cyclone type dust collecting apparatus of the present invention can be employed in other types of vacuum cleaners, such as upright-type vacuum cleaners or the like.

As described above, surrounding the cyclone body 11 with the cylindrical contaminant receptacle 13 provides the cyclone type dust collecting apparatus with a simple design. Furthermore, the partition 19, which blocks further movement of the contaminants around the receptacle 13, and the guide member 18, which prevents a reverse flow of contaminants through the contaminant outlet 11a, effectively collect the contaminants in the receptacle 13.

What is claimed is:

1. A cyclone type dust collecting apparatus for a vacuum cleaner comprising:

a cyclone body having a cylindrical shape, open upper and lower ends and a contaminant outlet, one of the open ends allowing air and contaminants into the cyclone body, the contamination outlet being located proximate the other of the open ends and allowing contaminants that have been separated from the air by centrifugation to pass through;

a contaminant receptacle for collecting the contaminants discharged through the contaminant outlet, the contaminant receptacle having open upper and lower ends and surrounding the cyclone body;

a base member connected to and closing the lower end of the cyclone body and the contaminant receptacle;

a cover removably connected to upper end of the cyclone body and the contaminant receptacle, the cover having an air inlet and an air outlet in communication with the cyclone body, the cover further including a contaminant separating grill having a plurality of fine holes formed therein, the grill extending downward from the air outlet into the cyclone body; and a partition disposed between the cyclone body and the contaminant receptacle, the partition restricting the movement of the contaminants in the contaminant receptacle.

2. The apparatus as claimed in claim 1, wherein the partition is proximate one edge of the contaminant outlet and has the same height as that of the cyclone body and the contaminant receptacle.

3. The apparatus as claimed in claim 1, wherein the cyclone body and the contaminant receptacle are of the same height and communicate with each other through the contaminant outlet exclusively.

4. The apparatus as claimed in claim 1, wherein the cyclone body, the contaminant receptacle, and the base member are integrally formed.

5. The apparatus as claimed in claim 1, further comprising reverse flow preventing means for preventing a reverse flow of the contaminants in the contaminant receptacle through the contaminant outlet and back into the cyclone body.

6. The apparatus as claimed in claim 5, wherein the reverse flow preventing means comprises a guide member extending from the outer surface of the cyclone body to an inner portion of the contaminant receptacle.

\* \* \* \* \*